(12) United States Patent
Hirade

(10) Patent No.: US 6,905,003 B2
(45) Date of Patent: Jun. 14, 2005

(54) ELEVATOR GROUP SUPERVISORY CONTROL DEVICE

(75) Inventor: Masaaki Hirade, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 155 days.

(21) Appl. No.: 10/466,224

(22) PCT Filed: Apr. 10, 2002

(86) PCT No.: PCT/JP02/03577

§ 371 (c)(1),
(2), (4) Date: Jul. 14, 2003

(87) PCT Pub. No.: WO03/084852

PCT Pub. Date: Oct. 16, 2003

(65) Prior Publication Data

US 2004/0154872 A1 Aug. 12, 2004

(51) Int. Cl.[7] .................................................. B66B 1/18
(52) U.S. Cl. ........................ 187/382; 187/247; 187/388
(58) Field of Search ........................ 187/247, 380–389, 187/391, 393

(56) References Cited

U.S. PATENT DOCUMENTS

| 3,586,133 A | * | 6/1971 | Santysiak | 187/381 |
| RE29,543 E | * | 2/1978 | Glaser | 187/386 |
| 4,846,311 A | * | 7/1989 | Thangavelu | 187/383 |
| 5,183,981 A | * | 2/1993 | Thangavelu | 187/383 |
| 5,250,766 A | * | 10/1993 | Hikita et al. | 187/391 |
| 5,354,957 A | * | 10/1994 | Robertson | 187/247 |
| 5,480,005 A | * | 1/1996 | Bittar | 187/383 |

FOREIGN PATENT DOCUMENTS

| JP | 58-6883 | 1/1983 |
| JP | 62-191383 | 8/1987 |
| JP | 02-231374 | 9/1990 |
| JP | 8-85681 | 4/1996 |

* cited by examiner

Primary Examiner—Jonathan Salata
(74) Attorney, Agent, or Firm—Leydig, Voit & Mayer, Ltd.

(57) ABSTRACT

An elevator group supervisory control system for an elevator system including indicators of positions of elevators, for a group supervisory control of elevators, in which a car reversal, which becomes a cause of irritation for passengers, is curbed. For a hall call registered at an elevator hall which is ahead of a final car call and within a floor range defined based on building or elevator conditions, an additional assignment is given to an elevator having shortest predicted arrival time, and which is not assigned to respond to the elevator hall call.

3 Claims, 4 Drawing Sheets

IRRITATING REVERSAL

A  #B

SCOPE FLOOR

ADDITIONAL ASSIGNMENT

THERE IS ELEVATOR HALL CALL WITHIN SCOPE FLOOR RANGE

A  #B

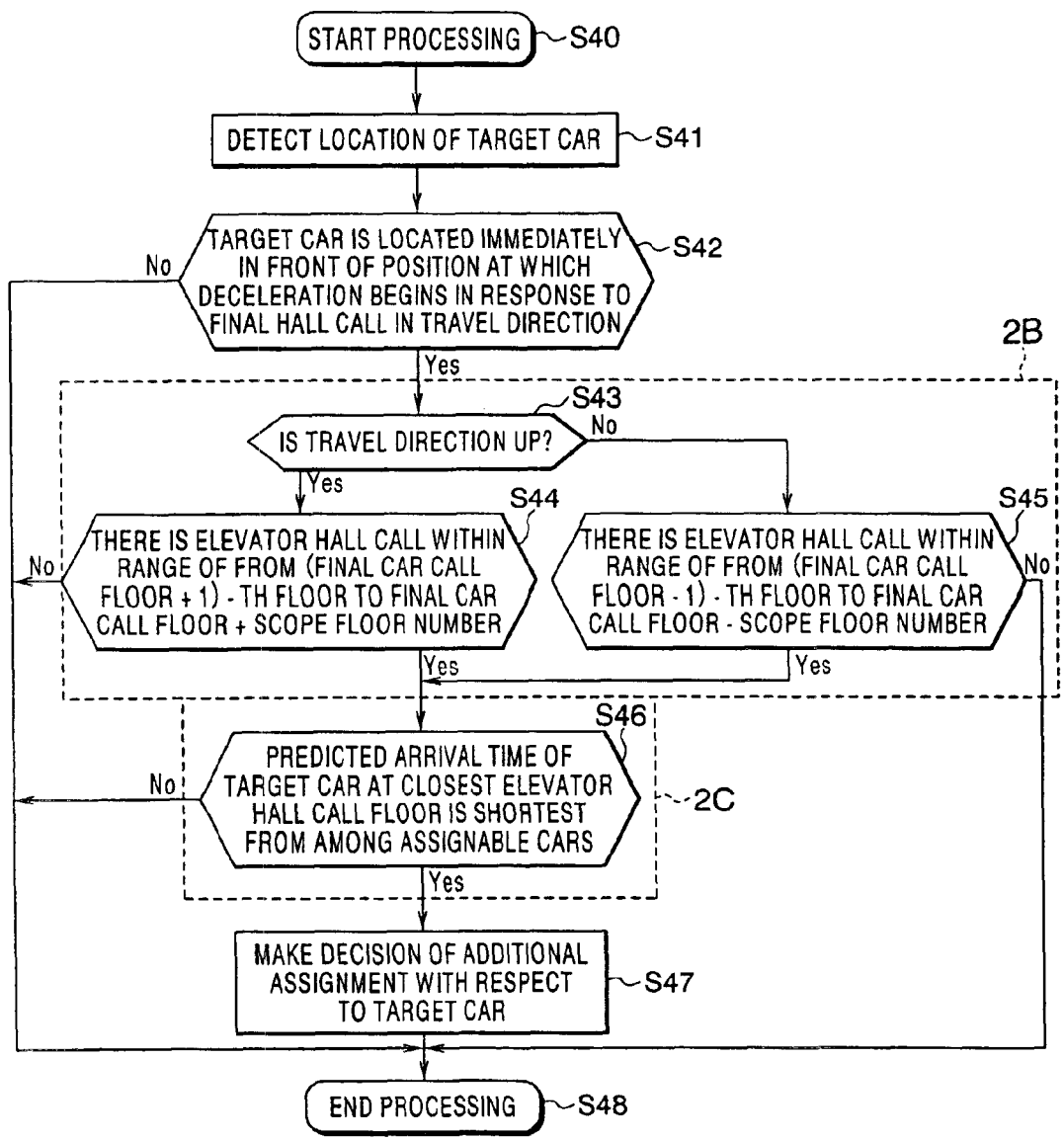

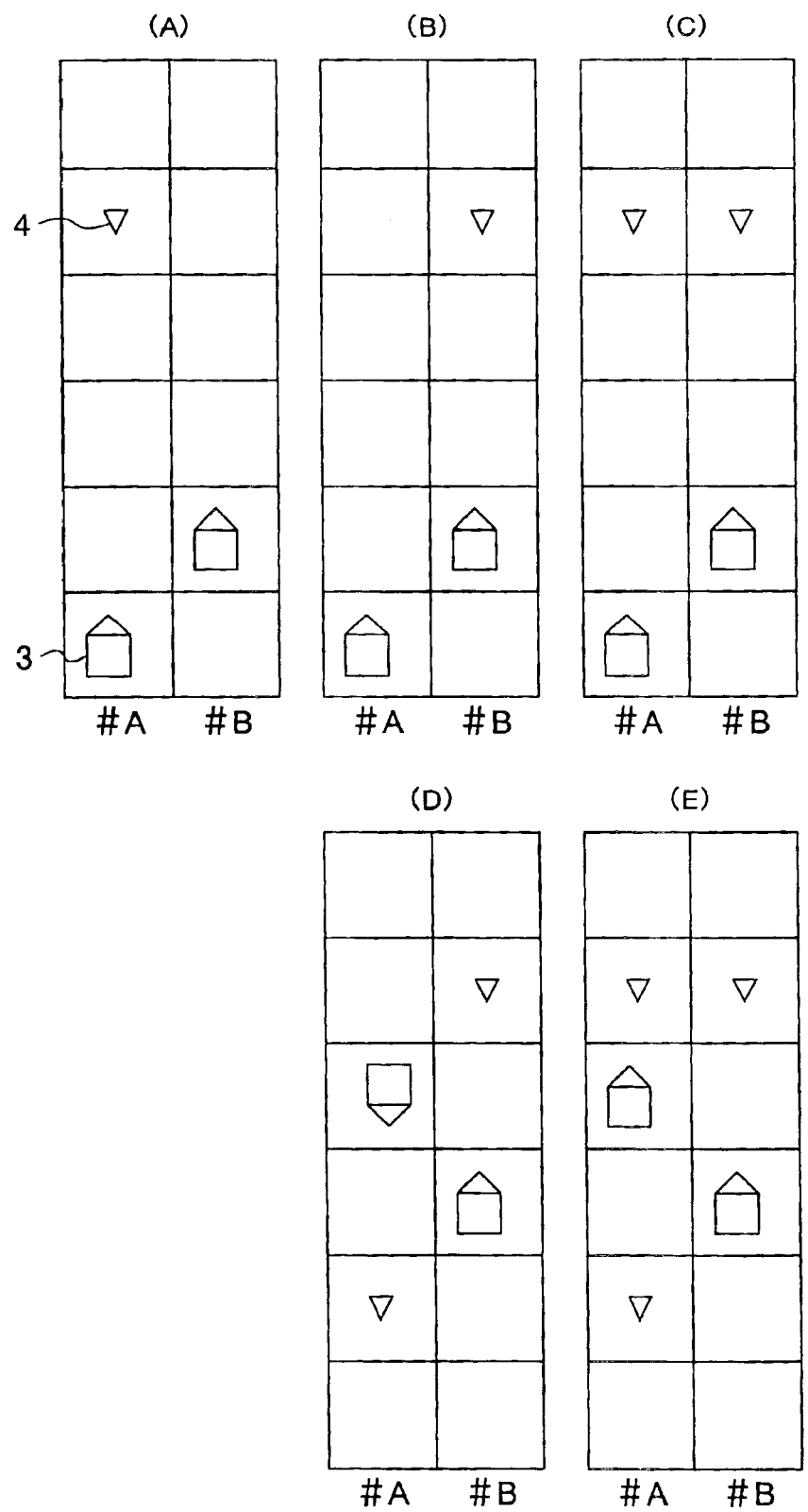

US 6,905,003 B2

ELEVATOR GROUP SUPERVISORY CONTROL DEVICE

TECHNICAL FIELD

The present invention relates to an elevator group supervisory control system for group supervisory control of a plurality of elevators. In particular, the present invention relates to an elevator group supervisory control system for curbing the reversal of the elevator car from a floor (hereinafter, referred to as car reversal, for short) which is adjacent to a floor where a passenger is waiting. This car reversal may cause irritation for the passenger when the elevator group supervisory control system is provided with indicators showing locations of the cars.

BACKGROUND ART

In an elevator system for supervising a plurality of elevators as one group, a car reversal which becomes a cause of irritation for passengers is a phenomenon in which the car reverses without service, although there is an elevator hail call ahead of the car in the travel direction (hereinafter referred to as irritating reversal). Considering the transporting efficiency in the group supervisory control, there are cases where the car reversal may increase the overall transporting efficiency. For that purpose, this kind of control is performed. However, this kind of reversal in a group supervisory control system with indicators increases a psychological feeling of irritation for the passengers, and may make them feel that the waiting time becomes all the more longer.

In addition, changes in the traffic conditions may also become a cause of the irritating reversal. Upon generation of an elevator hall call, even though a car closest to the hall call is assigned, there are cases where another car overtakes the assigned car while the assigned car is responding to multiple elevator hall calls and car calls before arriving at the floor where the elevator hall call was generated. It is possible for the unassigned other car to reverse after responding to a final hall call, and this may consequently become the irritating reversal.

As a method of reducing this kind of the irritating reversal due to overtaking, there is a method of performing an assignment change at a certain fixed time period or at certain timing, in which the assignment is changed to the closest car.

Relating to the assignment change, there is a method of performing a car assignment change under the condition that the assigned car is overtaken by another car, as disclosed in JP 58-6883 A, for example.

Further, there is a method of performing a car assignment change as disclosed in JP 62-191383 A. At the time of determining the direction reversal of the car, the assignment change is performed if the car is judged to be more optimal for (e.g. located closer to) an elevator hall call which is further than a final car call (reversal floor) than the assigned car. The irritating reversal can thus be avoided in many cases.

However, the car finally assigned in this manner is not always the car closest to the floor on which a hall call is generated. The irritating reversal may occur in the case of the assignment method (in which the closest car is not always assigned) or in the case where the overtaking occurs furthermore.

In order to further reduce the irritating reversals, a method of assigning a plurality of cars, which are close to an elevator hall call is a dependable way, instead of the method of performing the assignment change. In this case, however, there is a fear in that the overall transporting efficiency will drop because wasted travels and wasted stops increase.

The present invention has been made to solve the above-mentioned problems, and an object of the present invention is to provide an elevator group supervisory control system capable of curbing the irritating reversal, while considering a balance between the transporting efficiency and the irritating reversal.

DISCLOSURE OF THE INVENTION

In order to achieve the above-mentioned object, an elevator group supervisory control system according to the present invention is characterized by including: a detecting unit for detecting an elevator hall call within a specific floor range; an irritating reversal predicting unit for predicting a car reversal at a floor close to the elevator hall call, which is felt as irritating by passengers; an assignment computing unit for selecting an optimal car with respect to the elevator hall call; and an additional assigning unit for performing an additional assignment to an elevator satisfying specific conditions with respect to the elevator hall call within the specific floor range, based on results from the irritating reversal predicting unit. Also the elevator group supervisory control system is characterized in that the specific floor range is a floor range ahead of a final car call defined based on building or elevator conditions. Further, the elevator group supervisory control system is characterized in that the elevator satisfying the specific conditions is the elevator having the shortest predicted arrival time with respect to the elevator hall call within the specific floor range, and which is not in charge of the elevator hall call.

BRIEF DESCRIPTION OF THE DRAWINGS

FIG. 4 is a flowchart showing schematic operations of processing for detecting an irritating reversal and performing an additional assignment in an embodiment of the present invention; and FIG. 5 is an explanatory diagram showing results of curbing irritating reversals by additional assignment in the present invention, as compared with a conventional example.

BEST MODE FOR CARRYING OUT THE INVENTION

An embodiment mode of the present invention will be explained below with reference to the drawings.

Figure 1:
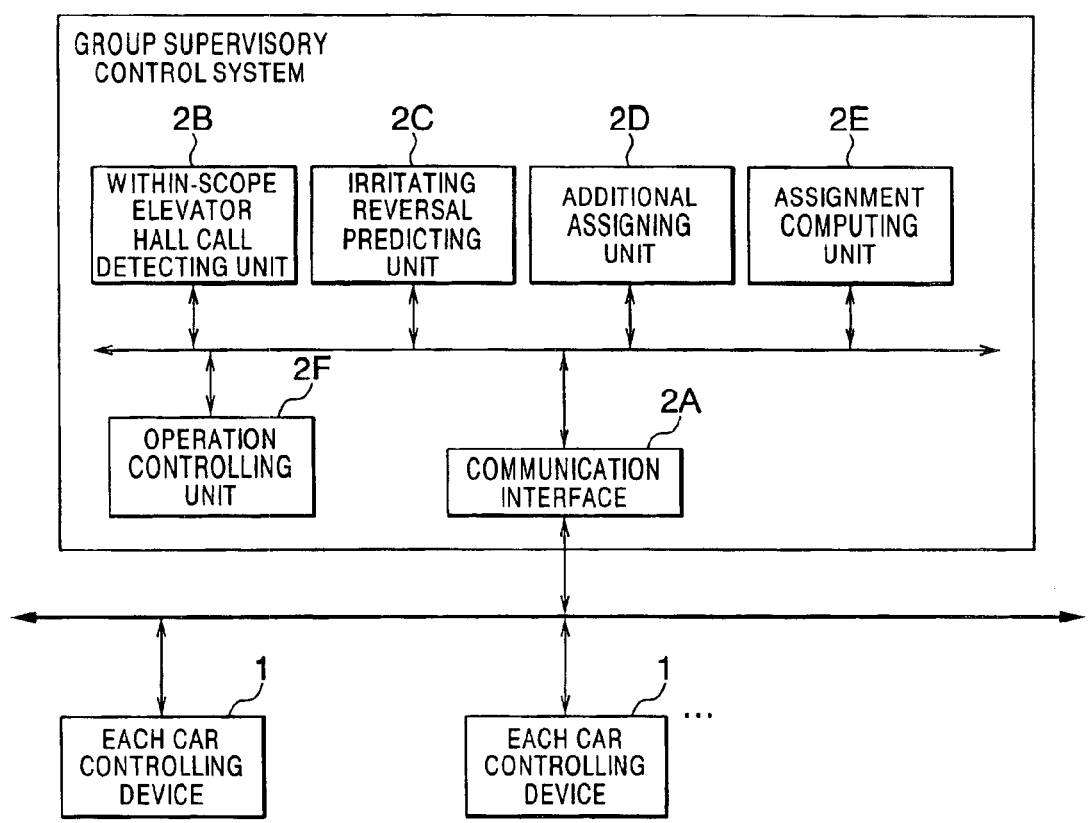
FIG. 1 is a diagram showing an example of an overall structure of an elevator group supervisory control system according to the present invention.

FIG. 1 is a diagram showing an example of an overall structure of an elevator group supervisory control system in accordance with an embodiment mode of the present invention.

The elevator group supervisory control system shown in FIG. 1 includes respective unit 2A to 2F explained below, and the respective unit 2A to 2F are structured by software in a microcomputer.

That is, the elevator group supervisory control system is provided with: a communication interface 2A for performing communication and data transmission with an each-car-controlling device 1 for controlling each elevator; a within-scope elevator hall call detecting unit 2B for detecting elevator hall calls within a set range of floors; an irritating reversal predicting unit 2C for predicting a car reversal at a floor close to an elevator hall call which is felt as irritating by passengers; an additional assigning unit 2D for performing an additional assignment based on results from the irritating reversal predicting unit 2C; an assignment computing unit 2E for selecting an optimal car when an elevator hall call is generated; and an operation controlling unit 2F for performing an operating command of each car based on the assignment results from the additional assigning unit 2D and the assignment computing unit 2E.

Operation in the embodiment mode of the present invention will be explained next using the drawings.

Figure 2:
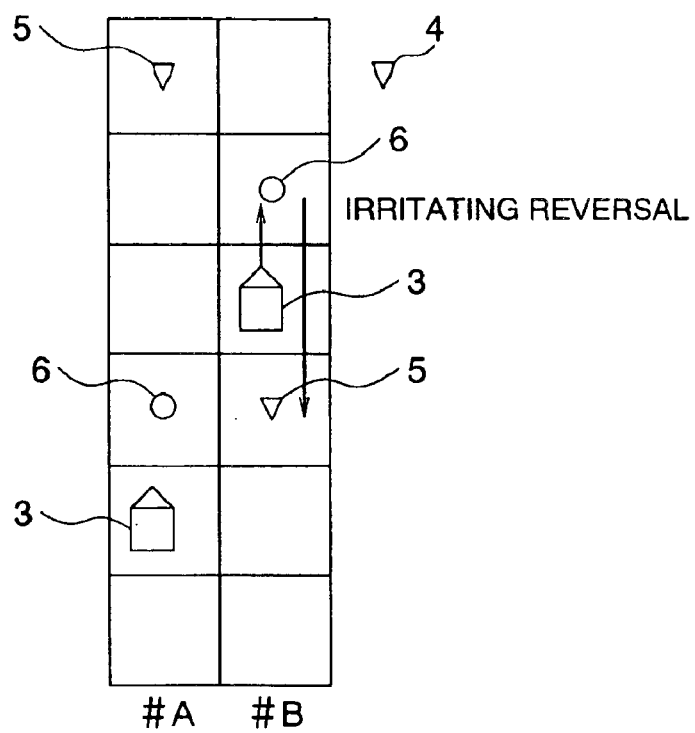
FIG. 2 is an explanatory diagram of an irritating reversal in an embodiment of the present invention.
Figure 3:
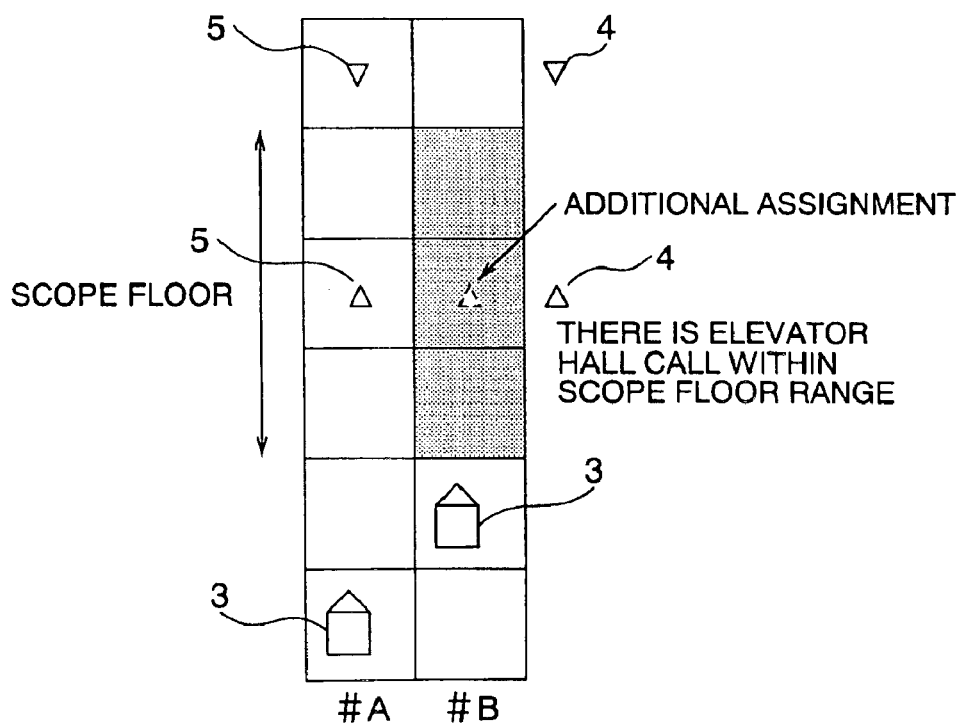
FIG. 3 is an explanatory diagram of an additional assignment in an embodiment of the present invention.

FIG. 2 shows an example showing the irritating reversal in the embodiment mode of the present invention. FIG. 3 is a diagram showing an example of performing an additional assignment based on the present invention, and FIG. 4 is a flowchart showing schematic operations of processing for detecting the irritating reversal and performing the additional assignment.

Operation within a building as shown in FIG. 2 and FIG. 3 is assumed in the embodiment mode of the present invention. Reference numeral 3 in these figures denotes elevators running within the building, reference numeral 4 denotes elevator hall calls registered at an elevator hall, reference numeral 5 denotes elevator hall calls assigned to the elevators 3 selected by the assignment computing unit 2E after registration of the elevator hall calls 4, and reference numeral 6 denotes car calls registered within elevators.

The elevator 3 of #A is assigned to the elevator hall call 4 in the example shown in FIG. 2. On the other hand, the elevator 3 of #B is in charge of the car call 6 generated ahead in the travel direction and the elevator hall call 5 from behind. That is, after responding to the car call 6 generated ahead in the travel direction, the elevator 3 of #B reverses, and then responds to the elevator hall call 5 from behind. In the case of elevators having indicators, in the example shown in FIG. 2, the elevator 3 of #B, which is located at the closest floor for a passenger who registered the elevator hall call 4, reverses immediately before arriving at the passenger's floor, and this becomes irritating reversal. This kind of the irritating reversal is detected by the irritating reversal predicting unit 2C of FIG. 1.

With respect to the irritating reversal as shown in FIG. 2, the additional assignment is performed in the present invention as in the example shown in FIG. 3, so that the irritating reversal is curbed. However, if the additional assignment is performed with respect to all of the floors ahead in the travel direction, there is a fear in that the number of calls that the elevator is in charge of will become wastefully large, and the waiting time will become longer. Therefore, the additional assignment is performed with respect to a floor range (scope floor number range) as shown in gray in the figure.

The scope floor number here is a number determined depending on the conditions of the building and the elevators, and may be set to the number of building floors ÷2, for example.

In FIG. 3, the elevator 3 of #A is assigned for two elevator hall calls 4, and for the elevator hall call on the lower floor within the scope floor range, the additional assignment is performed on the elevator 3 of #B which is running near the elevator hall where a passenger is waiting.

The procedure of processing for detecting the irritating reversal and performing the additional assignment will be explained next using the flowchart shown in FIG. 4. Note that the procedure shown by the flowchart in FIG. 4 is performed at every certain fixed period, or at a time when information of car location etc., acquired from the each car controlling device 1, changes.

When the processing begins at the above-described timing (a step S40), the location of a car that becomes a target of the processing is first acquired from the each-car-controlling device 1 in step S41. Then, if the target car is in a location immediately in front of the position at which deceleration begins in response to the final call in the travel direction in a step S42, operation proceeds to step S43. When that is not the case, the processing ends (step S48).

If the travel direction of the car is up in step S43, operation proceeds to step S44, while the operation proceeds to step S45 for other cases.

In step S44, if there is an elevator hall call 4 within a range of from (the final car call floor +1)-th floor to the final car call floor +the scope floor number, the operation proceeds to step S46, while the processing ends (step S48) for other cases. In the example of FIG. 3, of the two elevator hall calls 4, the elevator hall call 4 on the lower floor satisfies the condition of the step S44 (elevator 3 of #B).

In the step S45, the operation proceeds to step S46 if there is an elevator hall call 4 within a range of from (the final car call floor −1)-th floor to the final car call floor−the scope floor number, while processing ends for other cases (the step S48). Processing from the step S43 to the step S45 is run by the within-scope elevator hall call detecting unit 2B.

Next, in step S46, if the predicted arrival time of the target car at the closest elevator call floor is the shortest from among the assignable cars, the operation proceeds to step S47, while the processing ends (step S48) for other cases. The processing of step S46 is preformed by the irritating reversal detecting unit 2C of FIG. 1. In the example of FIG. 3, the target car, the elevator 3 of #B, has the shortest predicted time of arrival at the elevator hall call 4 on the lower floor among the elevators 3 of #A and #B, therefore satisfying the conditions of step S46.

In step S47, the additional assignment is performed on the target car by the additional assigning unit 2D with respect to the elevator hall call of step s46, and the processing ends (the step S48). In the example of FIG. 3, the elevator hall call assignment on the elevator 3 of #B, shown by a broken line, is the additional assignment determined by the step S47.

FIG. 5 shows the results of curbing the irritating reversal by the additional assignment in the present invention as compared with a conventional example.

If, for example, in FIG. 5(A) (diagram in which irritating reversal is predicted), the elevator 3 of #B is in a state in which it is likely to reverse although it is closer to the floor at which a hall call is generated, the assignment is changed to the elevator 3 of #B in the conventional example as in FIG. 5(B) (diagram showing assignment changes by the conventional example). However, with the present invention, the assignment is performed on both of the elevators 3 of #A and #B by the additional assignment as shown in FIG. 5C (diagram showing additional assignment in the present invention). As a result, as shown in FIG. 5(E) below FIG. 5(C), an arrival of a car at the floor at which the hall call was generated can be made with certainty, regardless of subsequent states.

However, with the conventional example, when the elevator 3 of #A overtakes the elevator 3 of #B, and moreover, is in charge of a hall call on a lower floor as in FIG. 5(D) below FIG. 5(B), the irritating reversal occurs as a result. Depending upon the circumstances, there may be a case in which the assignment is changed again to the elevator 3 of #A. However, if the elevator 3 of #A overtakes the elevator 3 of #B immediately before the floor at which the hall call is generated, there are many cases in which determination is already made that the elevator 3 of #B will stop at the floor at which the hall call is generated, and the assignment change cannot be performed in this case.

As described above, in addition to a method of assignment change disclosed in JP 58-6883 A or JP 62-191383 A, in the embodiment of the present invention, the irritating reversal can be further curbed by performing additional assignment on a car that satisfies the specific condition, in which the predicted arrival time of the car at the closest elevator hall call floor that is located within a scope floor range is the shortest among assignable cars.

INDUSTRIAL APPLICABILITY

As described above, in accordance with the present invention, in the group supervisory control system for elevators provided with indicators for group supervisory control of a plurality of elevators, there are such effects that deterioration of waiting time can be avoided as much as possible, and the reversal of the elevator immediately before the position at which a passenger is waiting, which becomes a cause of irritation for passengers, can be curbed by performing the additional assignment with respect to an elevator having the shortest predicted arrival time, and which is not in charge of an elevator hall call, for the hall call registration at an elevator hall which is ahead of the final car call and within the range of floors defined based on the building and elevator conditions.

What is claimed is:

1. An elevator group supervisory control system for group supervisory control of a plurality of elevators, comprising:

detecting means for detecting an elevator hall call within a specific floor range;

irritating reversal predicting means for predicting car reversal at a floor close to the elevator hall call, which is felt as irritating by passengers;

assignment computing means for selecting an optimal car with respect to the elevator hall call; and additional assigning means for giving an additional assignment to an elevator satisfying conditions with respect to the elevator hall call within the specific floor range, based on results from the irritating reversal predicting means.

2. The elevator group supervisory control system according to claim 1, wherein the specific floor range is a floor range ahead of a final car call based on building or elevator conditions.

3. The elevator group supervisory control system according to claim 1, wherein the elevator satisfying the conditions is the elevator having the shortest predicted arrival time with respect to the elevator hall call within the specific floor range, and which is not assigned to respond to the elevator hall call.

\* \* \* \* \*